United States Patent
Falk et al.

(10) Patent No.: US 10,630,473 B2
(45) Date of Patent: Apr. 21, 2020

(54) DETERMINATION OF A DEVICE-SPECIFIC PRIVATE KEY FOR AN ASYMMETRICAL CRYPTOGRAPHIC METHOD ON A DEVICE

(71) Applicant: SIEMENS AKTIENGESELLSCHAFT, München (DE)

(72) Inventors: Rainer Falk, Poing (DE); Steffen Fries, Baldham (DE)

(73) Assignee: Siemens Aktiengesellschaft, Munich (DE)

(*) Notice: Subject to any disclaimer, the term of this patent is extended or adjusted under 35 U.S.C. 154(b) by 32 days.

(21) Appl. No.: 15/580,334

(22) PCT Filed: May 20, 2016

(86) PCT No.: PCT/EP2016/061379
§ 371 (c)(1),
(2) Date: Dec. 7, 2017

(87) PCT Pub. No.: WO2017/005402
PCT Pub. Date: Jan. 12, 2017

(65) Prior Publication Data
US 2018/0167211 A1   Jun. 14, 2018

(30) Foreign Application Priority Data

Jul. 9, 2015   (DE) .......................... 10 2015 212 887

(51) Int. Cl.
*H04L 9/08* (2006.01)
(52) U.S. Cl.
CPC .......... *H04L 9/0866* (2013.01); *H04L 9/0869* (2013.01); *H04L 9/0877* (2013.01)

(58) Field of Classification Search
CPC .... H04L 9/0866; H04L 9/0869; H04L 9/0877
USPC .......................................................... 380/44
See application file for complete search history.

(56) References Cited

U.S. PATENT DOCUMENTS

| | | | |
|---|---|---|---|
| 9,037,875 B1 | 5/2015 | Poo et al. | |
| 2013/0051552 A1* | 2/2013 | Handschuh | G06F 21/602 380/44 |
| 2014/0258736 A1 | 9/2014 | Merchan et al. | |

(Continued)

FOREIGN PATENT DOCUMENTS

DE   102013203415 A1   8/2014

OTHER PUBLICATIONS

"TCG TCG Specification TPM 2.0 Mobile Reference Architecture", XP055271138: URL:http://www.trustedcomputinggroup.org/wp-content/uploads/TPM-2-0-Mobile-Reference-Architecture-v2-rt42-Specification FINAL2.pdf; 2014.

(Continued)

*Primary Examiner* — Brandon S Hoffman
*Assistant Examiner* — Nega Woldemariam
(74) *Attorney, Agent, or Firm* — Schmeiser, Olsen & Watts LLP

(57) ABSTRACT

Provided is a method and a security module for determining or providing a device-specific private key for an asymmetrical cryptographic process. A device-specific private primary seed is reproducibly formed from a device-specific secret piece of data, and the device-specific private key is determined from the device-specific private primary seed.

12 Claims, 2 Drawing Sheets

(56) References Cited

U.S. PATENT DOCUMENTS

Figure 1:
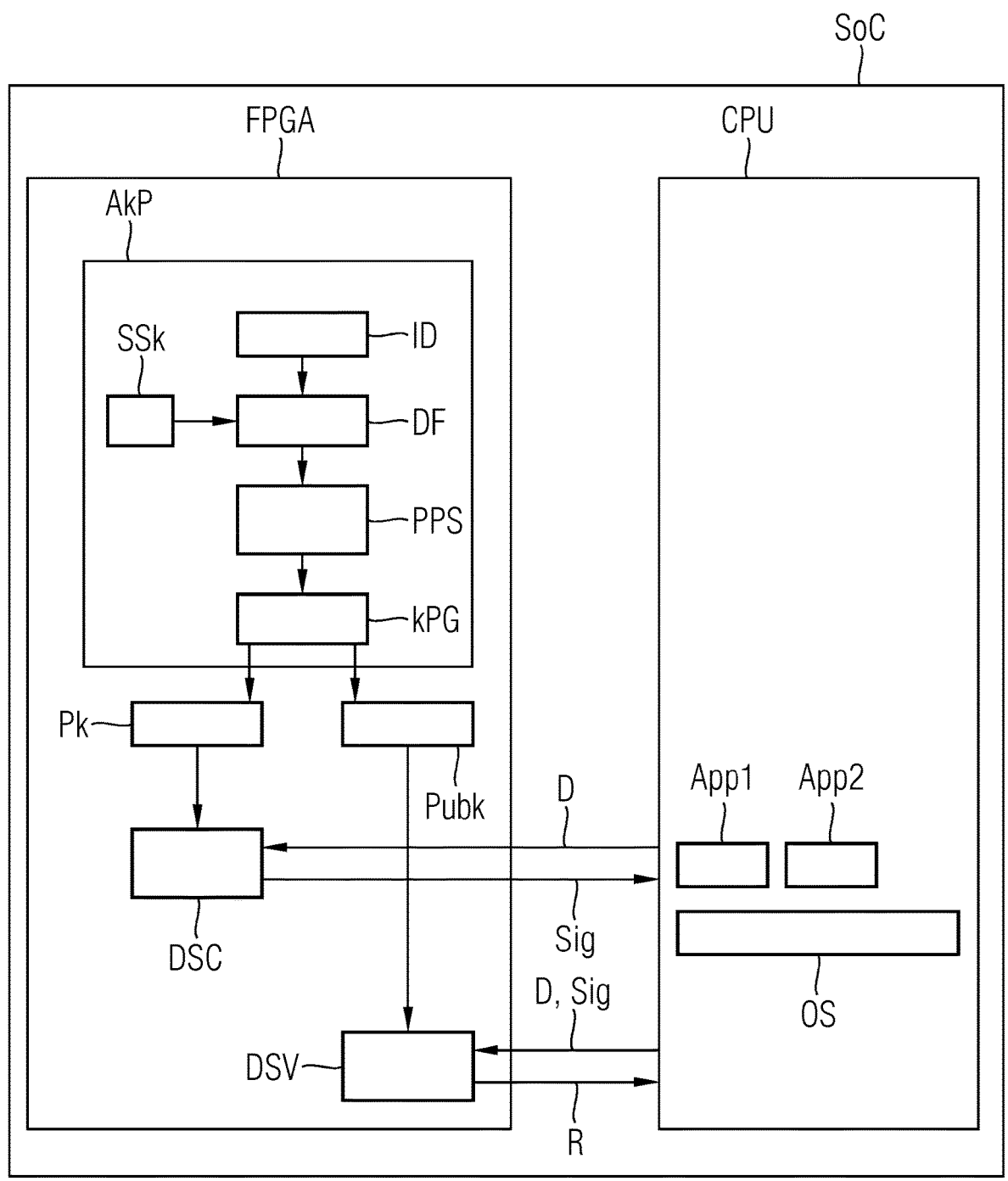

2015/0134942 A1    5/2015   Novak et al.

OTHER PUBLICATIONS

Shijun Zhao et al.: "Providinq Root of Trust for ARM TrustZone using On-Chip SRAM"; International Association for Cryptologic Research, Bd. 20141104:051144; pp. 1-13; XP061017248;; 2014.
PCT International Search Report dated Aug. 31, 2016 corresponding to PCT International Application No. PCT/EP2016/061379 filed May 20, 2016.

* cited by examiner

DETERMINATION OF A DEVICE-SPECIFIC PRIVATE KEY FOR AN ASYMMETRICAL CRYPTOGRAPHIC METHOD ON A DEVICE

CROSS-REFERENCE TO RELATED APPLICATIONS

This application claims priority to PCT Application No. PCT/EP2016/061379, having a filing date of May 20, 2016, based on German Application No. 10 2015 212 887.3, having a filing date of Jul. 9, 2015, the entire contents both of which are hereby incorporated by reference.

FIELD OF TECHNOLOGY

The following relates to a method and a security module for determining or providing a device-specific private key for an asymmetrical cryptographic method by means of a reproducible, device-specific private starting value.

BACKGROUND

In order to support long-term security requirements, it is advantageous if a user, in particular a device or field device, can flexibly support different cryptographic methods. For example, different crypto algorithms are intended to be able to be carried out or different key lengths or keys are intended to be able to be generated for different purposes or applications. Such a device therefore requires a multiplicity of private keys for different asymmetrical cryptographic methods. Such asymmetrical encryption methods are used, for example, for authentication with communication partners in the authentication and key agreement protocol, for example the Secure Socket Layer or Transport Layer Security SSL/TLS, or for issuing an attestation data structure. An asymmetrical method can also be used to create a digital signature or to encrypt and decrypt data.

In the case of a standard-compliant Version 2.0 Trusted Platform Module TPM, it is known that such a module contains a secret parameter, a so-called platform primary seed. This is a seed value or a starting value from which a secret algorithm-specific key suitable for this purpose can be derived by means of an algorithm-specific key derivation function. As a result, such a platform module can support different cryptographic methods without having to store a separate cryptographic key for each of these methods. However, the use of a primary platform starting value is restricted to deriving a private key for a particular asymmetrical method.

SUMMARY

An aspect relates to making key generation for an asymmetrical cryptographic method more secure.

The following relates to a method for determining a device-specific private key for an asymmetrical cryptographic method on a device, wherein a device-specific private starting value is reproducibly formed from a device-specific secret data item, and wherein the device-specific private key is determined from the device-specific private starting value.

The device is, for example, a programmable digital module, an FPGA module or an ASIC. A feature of the device is used for the device-specific secret data item and the device-specific private starting value is determined therefrom as a chip-individual secret parameter. This is carried out reproducibly and on the basis of the device-specific secret data item which can be formed only on the basis of the device. The device-specific private key is derived from the device-specific private starting value, for example according to known methods from the TPM 2.0 specification.

A private key can therefore be advantageously generated for an asymmetrical cryptographic method without being generated on the device, in particular a digital module such as an FPGA or ASIC, on which a non-volatile memory for storing keys is not available. It is therefore possible to generate a key pair without having to use an internal key memory for permanently storing a private asymmetrical key or a private secret starting value or seed value.

According to one configuration, a physically unclonable function is used to extract a PUF key as the device-specific secret data item. Characteristic hardware properties of the device are therefore used when creating the device-specific secret data item. These cannot be determined on hardware other than that of the present device. The device-specific key is therefore tied to particular hardware in an extremely secure manner and can only be determined on said hardware in the original state or in the unmanipulated state.

According to one configuration, the device-specific secret data item is formed by means of a symmetrical key derivation function using a key and a device-specific identifier. For example, a system key contained in a bit stream is derived by means of a symmetrical key derivation function with a device-specific identifier, for example a serial number of the chip.

According to one configuration, the device-specific private starting value is formed on the basis of an earmarking derivation parameter. Therefore, different key pairs can be output for different algorithms or periods or users or applications or authorizations.

According to one configuration, the device-specific private key is determined from the device-specific private starting value on the basis of an earmarking derivation parameter. Therefore, different key pairs can be output for different algorithms or periods or users or authorizations.

Embodiments of the invention also relate to a security module for providing a device-specific private key for an asymmetrical cryptographic method, having a generation unit for reproducibly forming a device-specific private starting value from a device-specific secret data item, and a key pair generation unit for determining the device-specific private key from the device-specific private starting value.

According to one development, the generation unit has access to a physically unclonable function (PUF) and a PUF key can be extracted as the device-specific secret data item.

According to one development, the security module also has a fuzzy key extractor for extracting a cryptographic key from a response from the PUF.

According to one development, the device-specific secret data item can be formed by means of a symmetrical key derivation function using a system key and a device-specific identifier.

According to one configuration, the key pair generation unit is designed to generate the device-specific private key and an associated public key.

According to one configuration, the public key can be provided in a digitally signed form, for example by means of a self-signed certificate. The identity or other properties of the owner of the public key can therefore be advantageously checked, for example.

According to one configuration, the device-specific private key can be accessed only inside the security module and cannot be stored, in particular. On account of the derivation of the device-specific private starting value or private primary seed as required, either by means of the PUF or by means of the pseudo-PUF, in which the system key with a chip identifier is used to algorithmically simulate a PUF functionality, neither the device-specific private key nor the device-specific private starting value advantageously needs to be permanently stored on the device. The device-specific private key is available only on the device and on request. In particular, the device-specific private key cannot be output via an interface of the security module.

The respective modules or units can be implemented using hardware and/or else software. In the case of a hardware implementation, the respective module or the respective unit may be in the form of an apparatus or part of an apparatus, for example in the form of a computer or a microprocessor. In the case of a software implementation, the respective module or the respective unit may be in the form of a computer program product (non-transitory computer readable storage medium having instructions, which when executed by a processor, perform actions), a function, a routine, part of a program code or an executable object.

Embodiments of the invention also relate to a computer program product comprising computer-executable instructions which, when loaded in a computer, are designed to carry out a method as claimed in one of claims 1 to 4.

A computer program product, for example a computer program means, may be provided or delivered, for example, as a storage medium, for example a memory card, a USB stick, a CD-ROM, a DVD or else in the form of a downloadable file from a server in a network. This can be effected, for example, by transmitting a corresponding file containing the computer program product or the computer program means in a wireless communication network. A control device, for example a microprocessor for a smart card or the like, is possible, in particular, as a program-controlled device.

BRIEF DESCRIPTION

Figure 2:
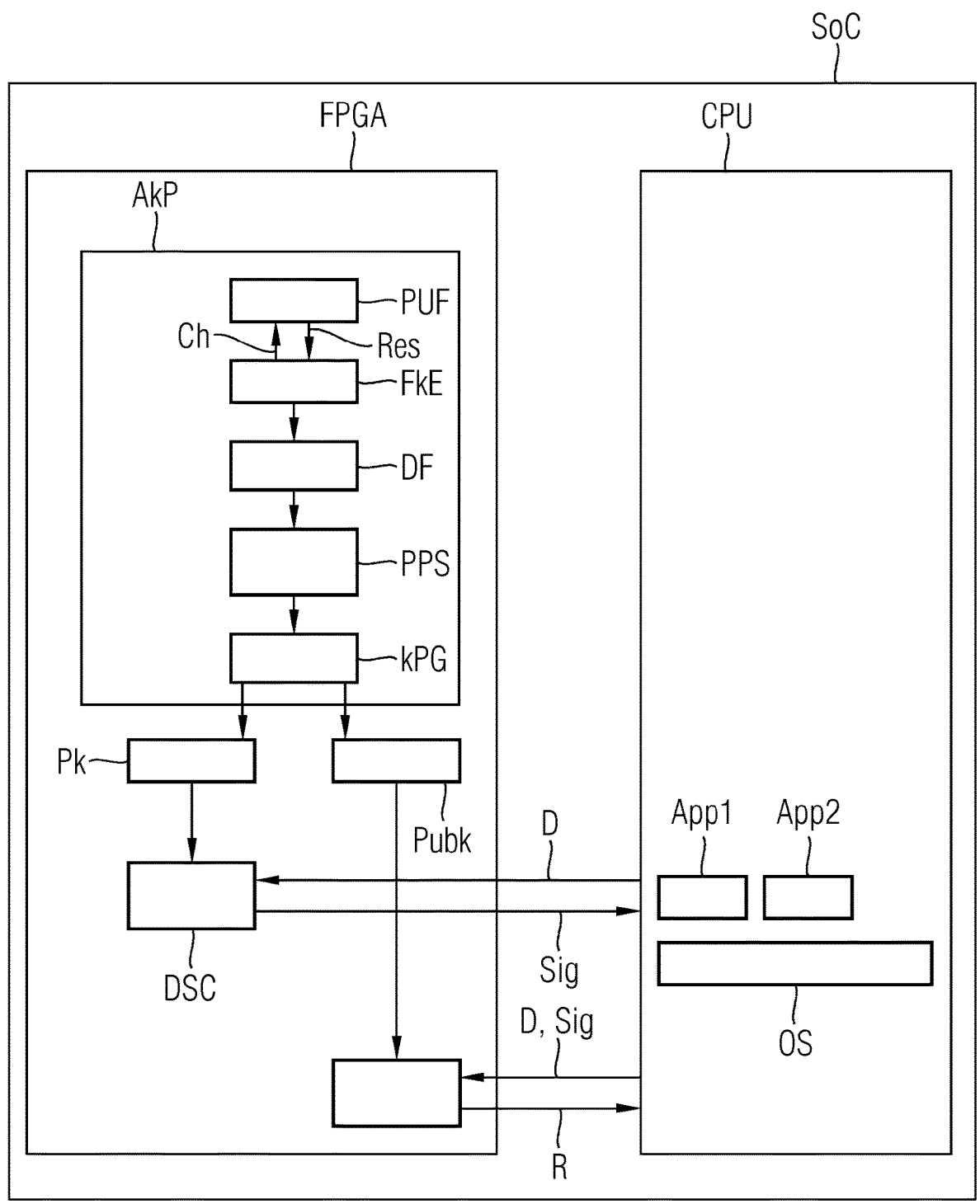

Some of the embodiments will be described in detail, with references to the following figures, wherein like designations denote like members, wherein:

FIG. 1: shows a schematic illustration of a security module for providing a device-specific private key for an asymmetrical cryptographic method according to a first exemplary embodiment of the invention; and FIG. 2: shows a schematic illustration of a security module for providing a device-specific private key for an asymmetrical cryptographic method according to a second exemplary embodiment of the invention.

DETAILED DESCRIPTION

FIG. 1 shows an implementation of a security module for providing a device-specific private key on a system-on-chip SoC. For example, it is a system-on-chip of an embedded system, for example a control device. The system-on-chip SoC contains, as programmable logic, a field programmable gate array FPGA which interchanges data with a processor CPU inside the system-on-chip, for example a central processing unit, in order to provide a signature for an asymmetrical cryptographic method or to check the signature of received data, for example.

A key pair comprising a private key PK and a public key PUBK, which are used for an asymmetrical cryptographic method on the system-on-chip SoC, is provided on the programmable logic FPGA by an asymmetrical key pair provider AKP. For example, the asymmetrical key pair is used by the processor CPU of the system-on-chip SoC having an operating system OS and two applications APP1, APP2 to have digital signatures calculated or to check them. For example, signature calculation methods such as RSA, DSA, EC-DSA etc. are used.

A permanent non-volatile key memory is not present or required on the FPGA and keys are not read in from an external memory module, for example an EPROM. The asymmetrical key pair provider AKP need not store the key pair, but rather generates it "on-the-fly" as it were from secret chip-individual information. In this case, the private starting value or private primary seed PPS is formed by a generation unit DF with an implemented private primary seed derivation function on the basis of a chip identifier ID and a secret system key SSK. The secret system key SSK is, for example, a system key which is present in an identical form on a plurality of copies of the embedded system, for example on account of an identical bit stream from which the key is generated and which was jointly loaded onto a plurality of devices in a series. The interaction between the chip ID, the secret system key SSK and the generation unit DF with a private primary seed derivation function implemented thereon acts as a PUF emulation or pseudo-PUF, that is to say an algorithmic simulation of a PUF functionality. A device-specific private starting value PPS which is individualized and which can be securely generated only from the asymmetrical key pair is therefore formed.

A key pair generation unit KPG or key pair generator finally provides the private key PK and an associated public key PUBK. The private key PK is used to calculate a digital signature by means of a digital signature calculator DSC, for example using data D received from a CPU, and this signature SIG is returned to the processor CPU. Data D and an associated signature SIG may likewise be checked by a digital signature verifier DSV provided on the FPGA using the public key PUB KEY, and a result R containing the checking result can be returned.

In one variant, the private primary seed PPS can also be duplicated and can be derived, for example, by means of an earmarking parameter in such a manner that a key pair for a stipulated purpose can be determined therefrom. It is therefore possible to advantageously use different key pairs on the system-on-chip SoC for different applications APP1, APP2 of the processor CPU.

FIG. 2 shows an alternative implementation for generating a private primary seed PPS by means of an unclonable function PUF and a fuzzy key extractor FKE. In this case, different challenges CH can be applied to the physically unclonable function PUF and the latter provides different responses R. The fuzzy key extractor FKE is used to form device-individual keys therefrom as device-specific secret data and a private primary seed PPS is formed therefrom by means of the generation unit DF from a respective device-specific secret data item.

In variants, a digital signature can be verified on the processor CPU rather than on the programmable logic FPGA, for example. For this purpose, the processor is provided with the public key PUBK, for example.

In further variants, it is possible to provide the key pair on an FPGA or an ASIC which provides the keys via an external interface. The FPGA or ASIC can therefore be used as a secure key memory.

The steps can be implemented in VHDL or Verilog, for example. It is also possible to provide, on the programmable logic FPGA, a soft CPU or a microprogrammable control unit which controls the sequence or partially carries out the calculations.

The method according to embodiments of the invention is preferably implemented on programmable digital logic, such as an FPGA, or on digital logic with a fixed functionality, such as an ASIC. In this case, there is no need for a non-volatile memory to store the keys, which non-volatile memory would not be present on conventional FPGAs anyway and could be implemented on ASICs only using a special production method and would therefore be complicated or expensive. An implementation on a microcontroller or on a digital signal processor is likewise conceivable.

Although the invention has been illustrated and described in greater detail with reference to the preferred exemplary embodiment, the invention is not limited to the examples disclosed, and further variations can be inferred by a person skilled in the art, without departing from the scope of protection of the invention.

For the sake of clarity, it is to be understood that the use of "a" or "an" throughout this application does not exclude a plurality, and "comprising" does not exclude other steps or elements.

The invention claimed is:

1. A method for determining device-specific private keys for an asymmetrical cryptographic method on a device, the method comprising:
reproducibly forming a first device-specific private starting value from a device-specific secret data item;
reproducibly forming a second device-specific private starting value from the device-specific secret data item;
determining a first device-specific private key from the device-specific private starting value; and
determining a second device-specific private key from the second device-specific private starting value;
wherein a first public key corresponding to the first device-specific private key is also generated;
wherein a second public key corresponding to the second device-specific private key is also generated;
wherein data and an associated signature are checked using the corresponding public key and a result of the check is sent to a processor of the device;
wherein both the first device-specific private starting value and the second device-specific private starting value are formed on the basis of a respective earmarking derivative parameter specific to a respective defined application of the processor such that the respective device-specific private key and the corresponding public key are specific to the respective defined application of the processor.

2. The method as claimed in claim 1, wherein a physically unclonable function is used to extract a PUF key as the device-specific secret data item.

3. The method as claimed in claim 1, wherein the device-specific secret data item is formed by means of a symmetrical key derivation function using a system key and a device-specific identifier.

4. The method as claimed claim 1, wherein the respective device-specific private key is accessed only inside the security module and cannot be stored.

5. The method as claimed in claim 1, wherein instead of or in addition to the respective device-specific private starting value being formed on the basis of the respective earmarking derivative parameter specific to the respective defined application of the processor, at least one of the first device-specific private key and the second device-specific key is determined from the respective device-specific private starting value on a basis of the respective earmarking derivation parameter such that the respective device-specific private key and the corresponding public key are specific to the respective defined application of the processor.

6. A security module for providing device-specific private keys for an asymmetrical cryptographic method, the security module comprising:
a generation unit for reproducibly forming a first device-specific private starting value and a second device-specific private starting value from a device-specific secret data item;
a key pair generation unit for generating a first device-specific private key and a second device-specific private key from the respective device-specific private starting value, wherein the key pair generation unit also generates an associated respective public key; and
a digital signature verifier;
wherein the first device-specific private starting value and the second device-specific private starting value are formed on the basis of a respective earmarking derivative parameter specific to a respective defined application of a processor such that the respective device-specific private key and the associated respective public key are specific to the respective defined application of the processor,
wherein data and an associated signature are checked by the digital signature verifier using the associated respective public key and a result of the check is sent to the processor.

7. The security module as claimed in claim 6, wherein the generation unit uses a physically unclonable function to extract a PUF key as the device-specific secret data item.

8. The security module as claimed in claim 7, further comprising: a fuzzy key extractor.

9. The security module as claimed in claim 6, wherein the device-specific secret data item is formed by the generation unit by means of a symmetrical key derivation function using a system key and a device-specific identifier.

10. The security module as claimed in claim 7, wherein the associated respective public key is provided in a digitally signed form by means of a self-signed certificate.

11. The security module as claimed in claim 7, wherein the respective device-specific private key is accessed only inside the security module and cannot be stored.

12. A computer program product, comprising a computer readable hardware storage device having computer readable program code stored therein, said program code executable by a processor of a computer system to implement a method comprising computer-executable instructions which, when loaded in a computer, are designed to carry out a method as claimed in claim 1.

* * * * *